United States Patent
Guo et al.

(10) Patent No.: US 10,668,628 B2
(45) Date of Patent: Jun. 2, 2020

(54) OMNIDIRECTIONAL MULTI-FINGER ASYNCHRONOUS GRIPPER FOR CASTING ROBOT

(71) Applicant: Anhui University of Science and Technology, Huainan (CN)

(72) Inventors: Yongcun Guo, Huainan (CN); Chengjun Wang, Huainan (CN); Runrun Ren, Huainan (CN); Zhiwei Zhu, Huainan (CN); Yuzhe Shen, Huainan (CN); Peng Wang, Huainan (CN); Chengke Xu, Huainan (CN)

(73) Assignee: ANHUI UNIVERSITY OF SCIENCE AND TECHNOLOGY, Huainan (CN)

( * ) Notice: Subject to any disclaimer, the term of this patent is extended or adjusted under 35 U.S.C. 154(b) by 243 days.

(21) Appl. No.: 15/774,274

(22) PCT Filed: Oct. 31, 2017

(86) PCT No.: PCT/CN2017/108822
§ 371 (c)(1),
(2) Date: May 7, 2018

(87) PCT Pub. No.: WO2019/061669
PCT Pub. Date: Apr. 4, 2019

(65) Prior Publication Data
US 2019/0358827 A1    Nov. 28, 2019

(30) Foreign Application Priority Data

Sep. 29, 2017   (CN) .......................... 2017 1 0903147

(51) Int. Cl.
B25J 15/02   (2006.01)
B25J 15/10   (2006.01)
(Continued)

(52) U.S. Cl.
CPC .......... B25J 15/0033 (2013.01); B25J 15/02 (2013.01); B25J 15/0273 (2013.01);
(Continued)

(58) Field of Classification Search
CPC .... B25J 15/0033; B25J 15/0061; B25J 15/02; B25J 15/0253; B25J 15/0266;
(Continued)

(56) References Cited

U.S. PATENT DOCUMENTS 2,462,691 A * 2/1949 Thompson ................ B66C 1/32
                                                                    294/81.54
5,127,695 A * 7/1992 Zoeten ...................... B66C 1/24
                                                                    294/119.1
(Continued)

FOREIGN PATENT DOCUMENTS

CN          102554934 A       7/2012
CN          104385292 A       3/2015
(Continued)

*Primary Examiner* — Dean J Kramer
(74) *Attorney, Agent, or Firm* — Bayramoglu Law Offices LLC

(57) ABSTRACT

An omnidirectional multi-finger asynchronous gripper for a casting robot, includes a connecting seat, an arc-shaped support, a mounting seat, longitudinal clamping devices, transverse adjusting devices and transverse clamping devices. The omnidirectional multi-finger asynchronous gripper is mounted to a tail end of the casting robot through the connecting seat; each longitudinal clamping device can independently and longitudinally clamp a casting or a mold core, is adjustable in spacing through the transverse adjusting devices, can automatically adapt to castings or mold cores with different outlines and can realize effective fitting-type adaptive clamping of specially-shaped castings and mold cores; and the transverse clamping devices are used for transversely and independently clamping the casting or mold (Continued)

core and a clamping position or angle can be adjusted through a swinging angle adjuster.

8 Claims, 4 Drawing Sheets

(51) Int. Cl.
*B25J 15/00* (2006.01)
*B22D 31/00* (2006.01)
*B25J 19/02* (2006.01)

(52) U.S. Cl.
CPC ......... *B25J 15/0293* (2013.01); *B22D 31/002* (2013.01); *B25J 15/10* (2013.01); *B25J 19/023* (2013.01)

(58) Field of Classification Search
CPC .... B25J 15/0273; B25J 15/0293; B25J 15/10; B25J 15/106; B25J 19/023; B22D 31/002
USPC ............ 294/207, 119.1, 81.54, 81.62, 67.33
See application file for complete search history.

(56) References Cited

U.S. PATENT DOCUMENTS

| | | | | |
|---|---|---|---|---|
| 6,082,080 A | * | 7/2000 | Holter | B25J 15/0253 |
| | | | | 294/67.32 |
| 6,802,499 B2 | * | 10/2004 | Grosso | B23Q 3/18 |
| | | | | 269/152 |
| 8,172,292 B1 | * | 5/2012 | Andersen | B25J 11/0045 |
| | | | | 294/2 |

FOREIGN PATENT DOCUMENTS

| | | |
|---|---|---|
| CN | 103029127 B | 4/2015 |
| CN | 102554931 B | 6/2015 |
| CN | 105252543 A | 1/2016 |
| CN | 104057460 B | 3/2016 |
| CN | 105881490 A | 8/2016 |
| CN | 205889183 U | 1/2017 |
| CN | 106737809 A | 5/2017 |
| CN | 107127734 A | 9/2017 |
| CN | 105088445 B | 11/2017 |
| EP | 0237137 A2 | 9/1987 |
| EP | 3164275 A1 | 5/2017 |
| WO | 2004028753 A2 | 4/2004 |

* cited by examiner

OMNIDIRECTIONAL MULTI-FINGER ASYNCHRONOUS GRIPPER FOR CASTING ROBOT

CROSS REFERENCE TO THE RELATED APPLICATIONS

This application is the national phase entry of International Application No. PCT/CN2017/108822, filed on Oct. 31, 2017, which claims priority from Chinese Patent Application 201710903147.5, filed on Sep. 29, 2017, the entire contents of which are incorporated herein by reference.

TECHNICAL FIELD

The present invention belongs to the technical field of industrial robot equipment, and in particular relates to an omnidirectional multi-finger asynchronous gripper for a casting robot.

BACKGROUND

High flexibility of industrial robots can meet various special demands in modern environment-friendly casting production. By adopting robots in casting production, not only can operators be liberated from heavy and monotonous manual labor to save labor force, but also it is an important means to improve casting production efficiency and manufacturing precision and quality, and realize mechanization, automation and civilization of casting production. At present, adopting advanced and applicable new casting technologies, improving casting equipment automation and particularly applying mobile robot technologies are key measures taken by casting enterprises to implement environment-friendly casting production and realize sustainable development. Since casting is performed in severe environments of high temperature, high dust, vibration, oil containment, noise and electromagnetic interference, and the weight of castings is great, common industrial robots cannot meet production demands. There are numerous key technologies which need to be urgently studied and broken through for casting robots in order to adapt to such working environments and operate normally. Casting robots not only can be used for handling and conveying castings in pressure casting and precision casting production, but also can be used in processes such as modeling, core making, core setting, pouring, cleaning and inspection of sand mold casting. Especially in production of medium-size and large-size castings, sizes and weights of sand cores and castings are comparatively great, the difficulty in executing core picking, core assembling, core setting and handling operations is great and the requirements are high. High-flexibility and high-load casting robots which can meet demands of operations such as core picking, core assembling, core setting and handling in casting production are urgently needed. When casting robots execute operation tasks such as core picking, core assembling, core setting and handling, in addition to robot bodies, robot grippers used as end executors are important key equipment.

At present, robot grippers used for gripping castings and mold cores can only continuously grip castings and mold cores of a single specification or with regular shapes, manual adjustment or gripper replacement is needed and automatic adjustment cannot be realized when specifications or shapes of castings or mold cores change, and since operators need to enter robot working areas to make adjustment, potential safety hazards of operators are increased and the working efficiency of robots are reduced. At the same time, continuous working of one robot to different specifications of workpieces cannot be realized, i.e., flexible work of one machine for multiple use cannot be realized.

Aiming at the problems existing in casting gripping, existing literal documents provide some solutions. Chinese patent application No. 201210051811.5 discloses a robot hand comprising a palm, a plurality of fingers, a motor reducer, wires, ropes and the like, gripping of workpieces is realized by controlling the palm and fingers, but the gripper can only realize angle adjustment, the universality is poor, the working space is small and the gripping of large-size castings and castings with complex shapes cannot be realized. Chinese patent application No. 201710029023.9 discloses a multipurpose robot arm gripper structure comprising a base, a gripper arm, a cylinder, a turnover supporting plate, a linking plate and a controller, the structure is simple, the length of the gripper arm cannot be adjusted according to the size of castings, the stability during casting gripping is poor, the working space is relatively small and the gripping of castings with complex structures cannot be satisfied. Chinese patent application No. 201510570943.2 discloses a multi-finger spindle gripping robot gripper comprising a connecting plate, a plurality of grippers and a plurality of cylinders, gripping of workpieces with simple shapes and structures is realized, the adaptability is poor, the length of the gripper is fixed, the stability is poor and the operation requirements of complex castings cannot be met. Chinese patent application No. 201410281605.2 discloses a multifunctional robot gripper consisting of a motor driving part, a vacuum cup and a mechanical gripper part, the vacuum cup is not applicable to large-size castings with complex surfaces, the working space of the mechanical gripper is small and the working efficiency is low. Chinese patent application No. 201110297466.9 provides a robot gripper device, a gripping part is driven to slide through a sliding mechanism to adjust a gripping position, the positioning accuracy is high, the gripper itself cannot be adjusted, consequently an optimum gripping position cannot be selected in a gripping process and operation requirements of specially-shaped castings cannot be realized. Chinese patent application No. 201010605168.7 discloses a robot gripper comprising a cylinder body, a bidirectional cylinder, a locating pin and a gripping nipper, and this gripper has the following disadvantages during operation: 1) the flexibility is low and the adaptability is limited; 2) the gripping stability is poor; and 3) the operation requirements of complex castings with specially-shaped sections cannot be met. Chinese patent application No. 201410689752.3 discloses a robot gripper device comprising a mechanical gripper, a sliding block, a lifting member, a mounting plate and a pull-up member, the gripping and lifting of workpieces are realized, but the working piece of the gripper is very greatly limited, the flexibility of the gripper is low, the working efficiency is low and the task of gripping castings with complex structures cannot be realized. Chinese patent application No. 201510792769.6 provides an adaptive robot dual-gripper device comprising a mounting flange, a gripper support, a gripper assembly and a gripper adjusting device, dual grippers can realize gripping of workpieces, but the working space is small, it is difficult to realize gripping of large-size castings, the flexibility of dual grippers is low, the stability is poor and the operation requirements of castings with complex surfaces cannot be realized.

With the continuous development and improvement of casting technologies, the demands for medium-size and large-size casting production and casting gripping automation become increasingly high. Most grippers in the existing technical solutions cannot meet the demands of operations for gripping heavy-weight and large-volume castings with complex surface structures.

SUMMARY

Aiming at overcoming the defects of the prior art, the present invention provides an omnidirectional multi-finger asynchronous gripper for a casting robot, which can be used for the casting robot to execute operation tasks such as core picking, core assembling, core setting and handling to medium-size and large-size castings in a casting molding process, can improve the operating efficiency, stability and safety of casting production, can reduce the labor intensity and production cost and can overcome the defects of the prior art.

The technical problem to be solved by the present invention is solved by adopting the following technical solution.

An omnidirectional multi-finger asynchronous gripper for a casting robot comprises a connecting seat, an arc-shaped support, a mounting seat, longitudinal clamping devices, transverse adjusting devices and transverse clamping devices. Herein, connecting lugs, connecting pins or pin holes which are used for being connected with end executors of the casting robot are provided on the connecting seat, and the connecting lugs are symmetrically disposed at upper and lower ends of the connecting seat; and a circular process hole is provided in a middle position of the connecting seat and is used for reducing the weight of the connecting seat. The arc-shaped support is used for connecting the mounting seat and the connecting seat, and an upper end and a lower end of the arc-shaped support are fixedly connected with the connecting seat and the mounting seat. Guide rails which are used for mounting the longitudinal clamping devices are provided on front and rear sides of the mounting seat, a slotted process hole is further provided between the two guide rails and herringbone sliding grooves are provided in left and right ends of the mounting seat. The longitudinal clamping devices are mounted on the mounting seat and are used for longitudinally clamping castings or mold cores; the longitudinal clamping devices are connected with the mounting seat through the transverse adjusting devices, and the transverse adjusting devices are mounted at two ends of the longitudinal clamping devices and are used for adjusting positions of the longitudinal clamping devices on the mounting seat and distance between two adjacent longitudinal clamping devices; and the transverse clamping devices are symmetrically mounted at left and right ends of the mounting seat and are used for transversely clamping castings or mold cores. Two cameras are further provided at a bottom of the mounting seat and the cameras are connected with the mounting seat through two-degree-of-freedom heads.

Each longitudinal clamping device comprises a longitudinal clamping cylinder, a longitudinal clamping sleeve, a sliding block, a longitudinal chuck and a longitudinal chuck telescopic cylinder. Herein, two ends of the longitudinal clamping cylinder are fixedly mounted on the mounting seat through the transverse adjusting devices and are used for providing power for the longitudinal movement of the longitudinal chuck, and the two ends of the longitudinal clamping cylinder are connected with a top of the longitudinal clamping sleeve through hinges; a mounting hole is provided in a top of the sliding block, a vertical guide hole is further provided in an upper end of the sliding block, a longitudinal guide hole is provided in a lower end of the sliding block and a guide rail sliding groove is provided in an inner side of the sliding block; the sliding block is sleeve-mounted on a piston rod of the longitudinal clamping cylinder through the mounting hole, and the sliding block is further sleeve-mounted on the guide rails of the mounting seat through the guide rail sliding groove and is used for mounting and supporting the longitudinal clamping sleeve, and the sliding block is connected with the mounting seat through the transverse adjusting devices; a section of the longitudinal clamping sleeve is homocentric-square-shaped, a longitudinal guide shaft is provided on an inner side of an upper end of the longitudinal clamping sleeve, and the longitudinal guide shaft is mounted in the longitudinal guide hole of the sliding block and is connected with the sliding block through a linear bearing or a sliding bearing; a section of a middle-upper portion of the longitudinal chuck is rectangular, the longitudinal chuck is sleeve-mounted in the longitudinal clamping sleeve, a first anti-slipping rubber layer is provided at a lower end of the longitudinal chuck and a first anti-falling hook is further provided at the lowermost end of the longitudinal chuck and is capable of preventing castings or mold cores from falling in the operation process; and the longitudinal chuck telescopic cylinder is used for providing power for extension and retraction of the longitudinal chuck in the longitudinal clamping sleeve, an upper end of the longitudinal chuck telescopic cylinder is connected with the longitudinal clamping sleeve through a hinge and a lower end of the longitudinal chuck telescopic cylinder is connected with the longitudinal chuck through a hinge.

Each transverse adjusting device comprises gear racks, an anti-slipping stop plate, a hand ring and extension springs. Herein, the number of the gear racks is two and the two gear racks are disposed in parallel at tops of front and rear ends of the mounting seat. A top of the anti-slipping stop plate is sleeve-mounted at the two ends of the longitudinal clamping cylinder and is connected with the piston rod of the longitudinal clamping cylinder through a cylindrical pair, stop teeth are provided below one end of the anti-slipping stop plate, a circular hook hole and a vertical guide pillar are provided at the other end of the anti-slipping stop plate, the circular hook hole is used for mounting the extension springs, the vertical guide pillar is disposed in the vertical guide hole of the sliding block, and the anti-slipping stop plate is engaged with the gear racks and is used for limiting the transverse movement of the longitudinal clamping device on the mounting seat; and the anti-slipping stop plate and the sliding block of the longitudinal clamping device are connected through two extension springs. The hand ring is located on one side of the anti-slipping stop plate is fixedly connected with the anti-slipping stop plate and is used for adjusting the anti-slipping stop plate. The two extension springs are symmetrically disposed on an outer side surface of the sliding block and are used for tightly pressing the anti-slipping stop plate onto the gear racks; and upper ends of the extension springs are connected with the anti-slipping stop plate and lower ends of the extension springs are connected with the sliding block.

Each transverse clamping device comprises a transverse clamping cylinder, a swinging angle adjuster, a transverse clamping sleeve, a transverse chuck and a transverse chuck telescopic cylinder. Herein, the transverse clamping cylinder is mounted below the mounting seat and is used for providing power for the transverse movement of the transverse clamping sleeve and the transverse chuck, a middle portion of the transverse clamping cylinder is connected with the mounting seat through a hinge, an inner side end of the transverse clamping cylinder is connected with the swinging angle adjuster through a hinge, a guide sliding pin is further provided at a top of the inner side end of the transverse clamping cylinder, and the guide sliding pin is disposed in the herringbone sliding groove of the mounting seat and is slidable along the herringbone sliding groove; and an outer side end of the transverse clamping cylinder is fixedly connected with a top of the transverse clamping sleeve. The swinging angle adjuster is fixedly mounted at a bottom of the mounting seat and is connected with the mounting seat through a hinge. The transverse chuck is sleeve-mounted in the transverse clamping sleeve and is used for transversely clamping castings or mold cores, and the transverse chuck is upwards and downwards slidable along the transverse chuck sleeve to adjust length of a clamped portion; a second anti-slipping rubber layer is provided at a lower end of the transverse chuck and is used for increasing friction force between the transverse chuck and the clamped castings or mold cores; a second anti-falling hook is further provided at the lowermost end of the transverse chuck and can prevent castings or mold cores from falling in a clamping or handling process. An upper end of the transverse chuck telescopic cylinder is connected with the transverse clamping sleeve through a hinge, and a lower end of the transverse chuck telescopic cylinder is connected with the transverse chuck through a hinge and is used for providing power for extension and reaction movement of the transverse chuck; and the guide sliding pin is connected with the transverse clamping cylinder through a thread and a pin cap is provided at a top of the guide sliding pin.

The swinging angle adjuster comprises a swinging angle adjusting cylinder, a left connecting rod and a right connecting rod, and is used for adjusting swinging angles of two transverse clamping devices. Herein, the swinging angle adjusting cylinder is mounted at the bottom of the mounting seat and is used for providing power for swinging of the transverse clamping devices, a middle portion of the swinging angle adjusting cylinder is connected with the mounting seat through a hinge, an outer side end of the swinging angle adjusting cylinder is connected with the left connecting rod and the right connecting rod through coaxial hinges; the left connecting rod is located on a left side of the swinging angle adjusting cylinder and a left end of the left connecting rod is connected with the transverse clamping cylinder on a left side through a hinge; and a right end of the right connecting rod is connected with the transverse clamping cylinder on a right side through a hinge.

During use, firstly the longitudinal clamping devices or transverse clamping devices are selectively used according to casting operation tasks, and the transverse adjusting devices are adjusted according to the shape of a gripped casting or mold core to keep reasonable spacing between the longitudinal clamping devices on the mounting seat; and at the same time, swinging angles of the transverse clamping devices at left and right ends of the mounting seat are adjusted by driving the swinging angle adjusting cylinder in the swinging angle adjuster. According to the height of the gripped casting or mold core, the longitudinal chuck telescopic cylinder and the transverse chuck telescopic cylinder are respectively driven, and positions of the longitudinal chuck and transverse chuck in the longitudinal clamping sleeve and transverse clamping sleeve are respectively adjusted.

When the longitudinal clamping devices only need to be used for longitudinally clamping the gripped casting or mold core, firstly output ends of the longitudinal clamping cylinders are elongated, and front-rear spacing of the longitudinal chucks is expanded; and then, the longitudinal clamping devices are put on the gripped casting or mold core, and the output ends of the longitudinal clamping cylinders are shortened to enable the longitudinal chucks to clamp the casting or mold core, so that gripping and handling tasks can be executed. After the gripping and handling tasks are completed, the longitudinal clamping cylinders are elongated, so that the longitudinal chucks can be loosened. When the transverse clamping devices need to be used, the loosening or clamping of the transverse chucks can be realized by elongating or shortening the transverse clamping cylinders. When operation tasks are executed, the cameras transmit acquired image information to the casting robot and a controller of the casting robot performs recognition, judgment and decision-making.

The present invention has the following beneficial effects: as compared with the prior art, the positions of the longitudinal clamping devices of the present invention on the mounting seat are adjustable, each longitudinal clamping device independently executes longitudinal clamping tasks, automatically adapts to castings or mold cores with different outline sand can realize effective fitting-type adaptive clamping of specially-shaped castings and mold cores; and not only can the transverse clamping devices realize transverse clamping of castings or mold cores, but also the swinging angles of the transverse clamping devices and the length of the clamped portion of the transverse chucks can be adjusted to enable the casting robot to realize transverse adaptive clamping of castings or mold cores, demands of different operations such as core picking, core assembling, core setting and handling of medium-size and large-size castings can be met, the efficiency, quality and safety of core assembling, core setting and handling operations in casting production can be improved, and the labor intensity of operators and the production cost are reduced. Particularly, the present invention can meet the operation demand for omnidirectional fitting-type effective gripping of specially-shaped sand cores and castings, the sand cores or castings can be prevented from being damaged in core assembling and core setting processes, and the stability, safety and adaptability of operation are improved. Through the cameras mounted below the mounting seat, casting operation tasks such as recognition of castings, mold cores or sand boxes and gripping, placement and handling of sand core assemblies and castings are automatically completed, the automation level is high, the working efficiency is high and the labor intensity is low; and the present invention has the advantages of simple and compact structure, high safety, strong adaptability, simple and convenient operation and maintenance, one machine for multiple use and the like, and can overcome the defects of the prior art.

DETAILED DESCRIPTION OF THE EMBODIMENTS

Figure 1:
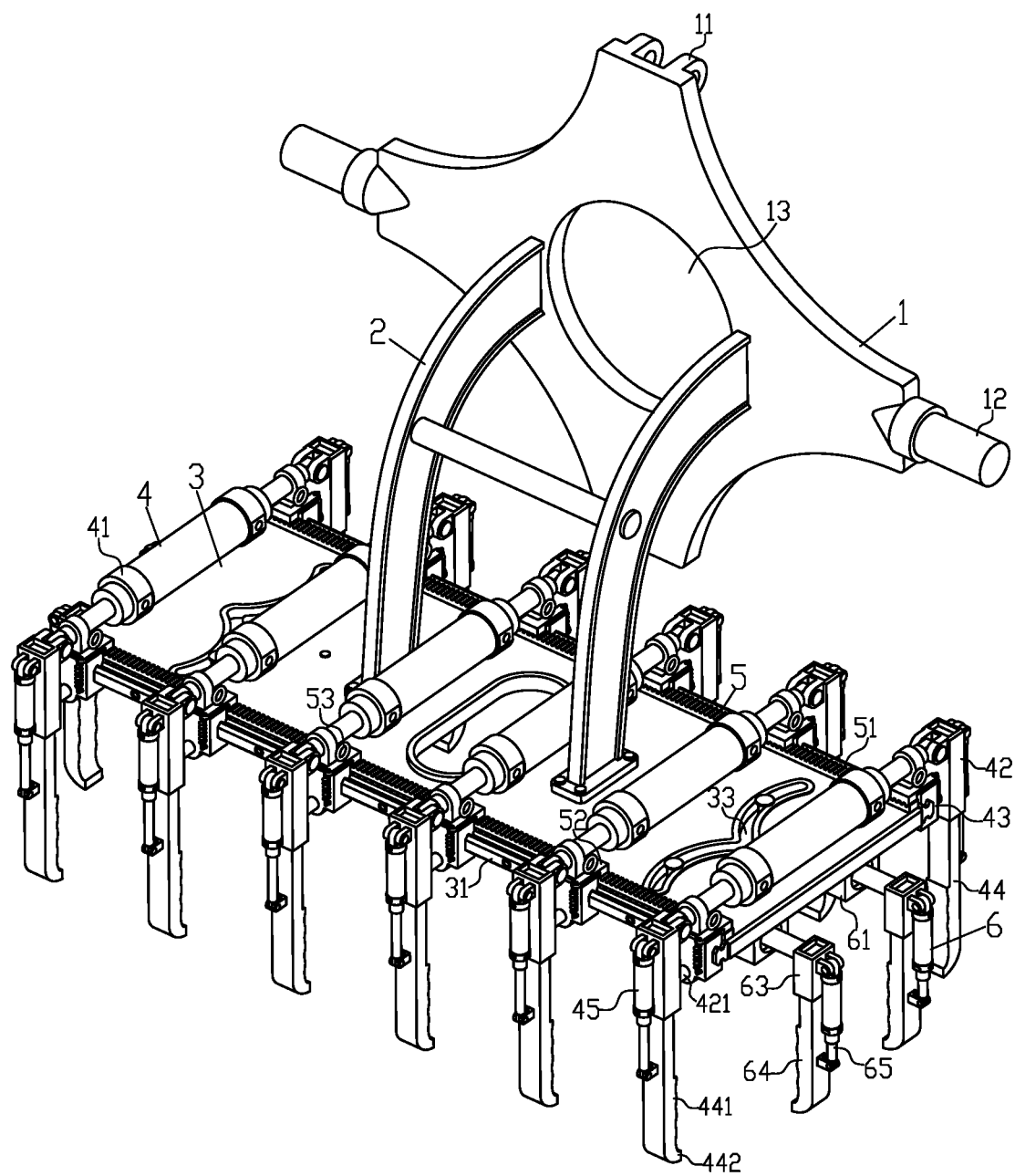
FIG. 1 illustrates an overall structural schematic view of the present invention.

In order to enable the technical means and creation features realized by the present invention and the purposes and effects achieved by the present invention to be easily understood, the present invention will be further described below in combination with embodiments and drawings.

Embodiment 1

As illustrated in FIG. 1, FIG. 2, FIG. 3 and FIG. 4, an omnidirectional multi-finger asynchronous gripper for a casting robot comprises a connecting seat 1, an arc-shaped support 2, a mounting seat 3, longitudinal clamping devices 4, transverse adjusting devices 5 and transverse clamping devices 6. Herein, connecting lugs and connecting pins 12 which are used for being connected with end executor interfaces of the casting robot are provided on the connecting seat 1, and the connecting lugs 11 are symmetrically disposed are provided at upper and lower ends of the connecting seat 1; and the two connecting pins 12 are kept to be coaxial and are symmetrically disposed on left and right sides of the connecting seat 1; a circular process hole 13 is provided in a middle position of the connecting seat 1 and is used for reducing the weight of the connecting seat 1. The arc-shaped support 2 is used for connecting the mounting seat 3 and the connecting seat 1, and an upper end and a lower end of the arc-shaped support 2 are fixedly connected with the connecting seat 1 and the mounting seat 3. Guide rails 31 which are used for mounting the longitudinal clamping devices 4 are provided on front and rear sides of the mounting seat 3, a slotted process hole 32 is further provided between the two guide rails 31 and herringbone sliding grooves 33 are provided in left and right ends of the mounting seat 3. The longitudinal clamping devices 4 are mounted on the mounting seat 3 and are used for longitudinally clamping castings or mold cores; the longitudinal clamping devices 4 are connected with the mounting seat 3 through the transverse adjusting devices 5, and the transverse adjusting devices 5 are mounted at two ends of the longitudinal clamping devices 4 and are used for adjusting positions of the longitudinal clamping devices 4 on the mounting seat 3 and distance between two adjacent longitudinal clamping devices 4; and the transverse clamping devices 6 are symmetrically mounted at left and right ends of the mounting seat 3 and are used for transversely clamping castings or mold cores. Two cameras 7 are further provided at a bottom of the mounting seat 3 and the cameras 7 are connected with the mounting seat 3 through two-degree-of-freedom heads 8.

As illustrated in FIG. 1, FIG. 2, FIG. 4 and FIG. 6, each longitudinal clamping device 4 comprises a longitudinal clamping cylinder 41, a longitudinal clamping sleeve 42, a sliding block 43, a longitudinal chuck 44 and a longitudinal chuck telescopic cylinder 45. Herein, two ends of the longitudinal clamping cylinder 41 are fixedly mounted on the mounting seat 3 through the transverse adjusting devices 5 and are used for providing power for the longitudinal movement of the longitudinal chuck 44, and the two ends of the longitudinal clamping cylinder 41 are connected with a top of the longitudinal clamping sleeve 42 through hinges; a mounting hole 431 is provided in a top of the sliding block 43, a vertical guide hole 432 is further provided in an upper end of the sliding block 43, a longitudinal guide hole 433 is provided in a lower end of the sliding block 43 and a guide rail sliding groove 434 is provided in an inner side of the sliding block 43; the sliding block 43 is sleeve-mounted on a piston rod of the longitudinal clamping cylinder 41 through the mounting hole 431, and the sliding block 43 is further sleeve-mounted on the guide rails 31 of the mounting seat 3 through the guide rail sliding groove 434 and is used for mounting and supporting the longitudinal clamping sleeve 42, and the sliding block 43 is connected with the mounting seat 3 through the transverse adjusting devices 5; a section of the longitudinal clamping sleeve 42 is homocentric-square-shaped, a longitudinal guide shaft 421 is provided on an inner side of an upper end of the longitudinal clamping sleeve 42, and the longitudinal guide shaft 421 is mounted in the longitudinal guide hole 433 of the sliding block 43 and is connected with the sliding block 43 through a linear bearing or a sliding bearing; a section of a middle-upper portion of the longitudinal chuck 44 is rectangular and the longitudinal chuck 44 is sleeve-mounted in the longitudinal clamping sleeve 42; and the longitudinal chuck telescopic cylinder 45 is used for providing power for extension and retraction of the longitudinal chuck 44 in the longitudinal clamping sleeve 42, an upper end of the longitudinal chuck telescopic cylinder 45 is connected with the longitudinal clamping sleeve 42 through a hinge and a lower end of the longitudinal chuck telescopic cylinder 45 is connected with the longitudinal chuck 44 through a hinge.

As illustrated in FIG. 1, FIG. 4, FIG. 5 and FIG. 6, each transverse adjusting device 5 comprises gear racks 51, an anti-slipping stop plate 52, a hand ring 53 and extension springs 54. Herein, the number of the gear racks 51 is two and the two gear racks 51 are disposed in parallel at tops of front and rear ends of the mounting seat 3. Stop teeth 521 are provided below one end of the anti-slipping stop plate 52, a circular hook hole 522 and a vertical guide pillar 523 are provided at the other end of the anti-slipping stop plate 52, the circular hook hole 522 is used for mounting the extension springs 54, the vertical guide pillar 523 is disposed in the vertical guide hole 432 of the sliding block 43, and the anti-slipping stop plate 52 is engaged with the gear racks 51 and is used for limiting the transverse movement of the longitudinal clamping device 4 on the mounting seat 3; and the anti-slipping stop plate 52 and the sliding block 43 of the longitudinal clamping device 4 are connected through two extension springs 54. The hand ring 53 is located on one side of the anti-slipping stop plate 52 is fixedly connected with the anti-slipping stop plate 52 and is used for adjusting the anti-slipping stop plate 52. The two extension springs 54 are symmetrically disposed on an outer side surface of the sliding block 43 and are used for tightly pressing the anti-slipping stop plate 52 onto the gear racks 51; and upper ends of the extension springs 54 are connected with the anti-slipping stop plate 52 and lower ends of the extension springs 54 are connected with the sliding block 43.

Figure 2:
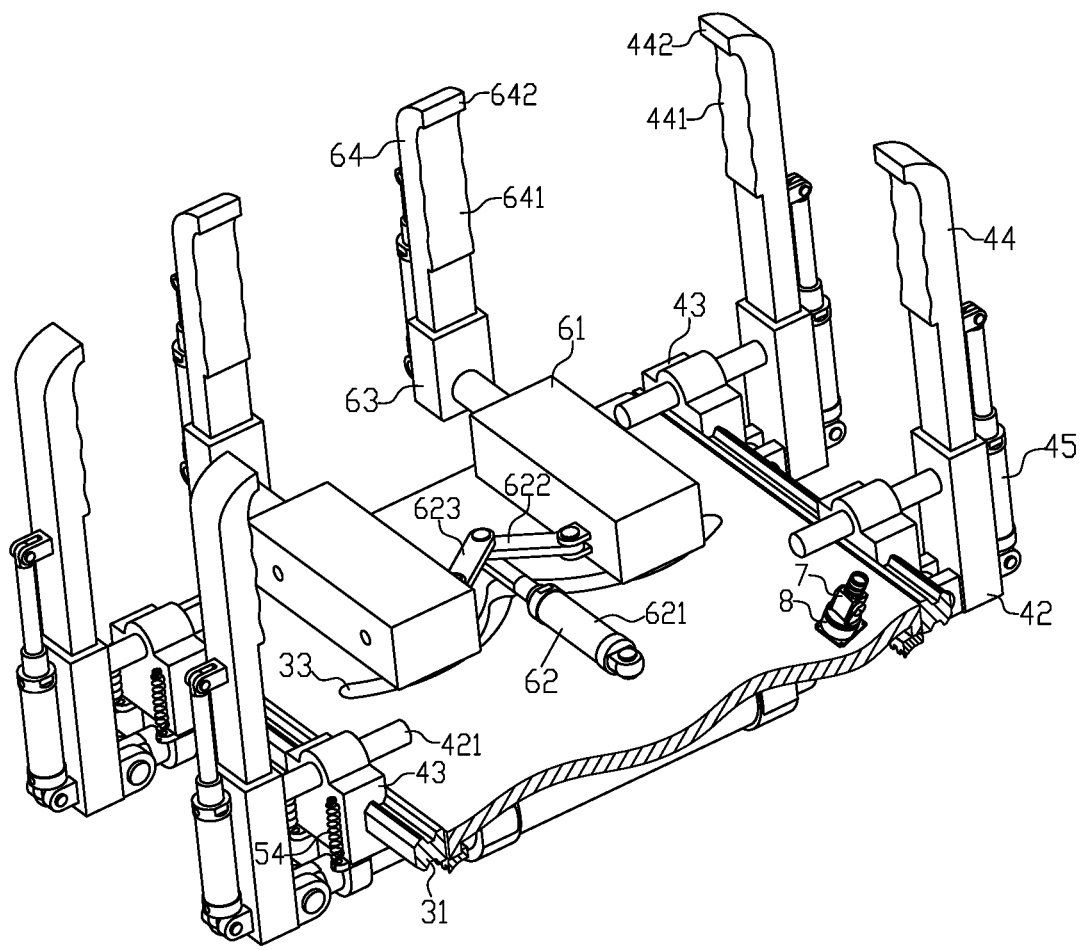
FIG. 2 illustrates a structural schematic view of a transverse clamping device of the present invention.
Figure 3:
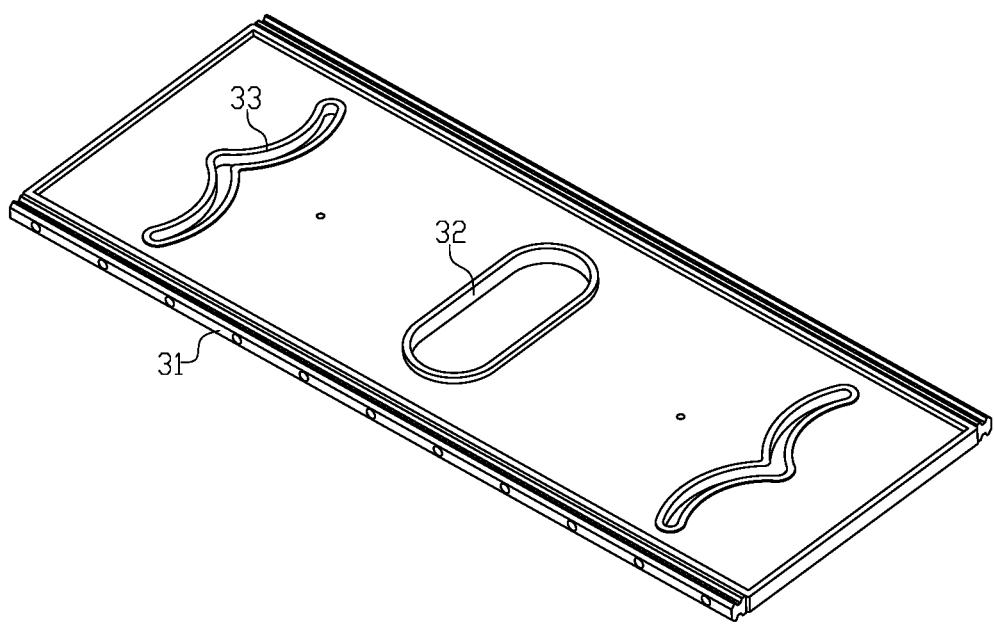
FIG. 3 illustrates a structural schematic view of a mounting seat of the present invention.
Figure 4:
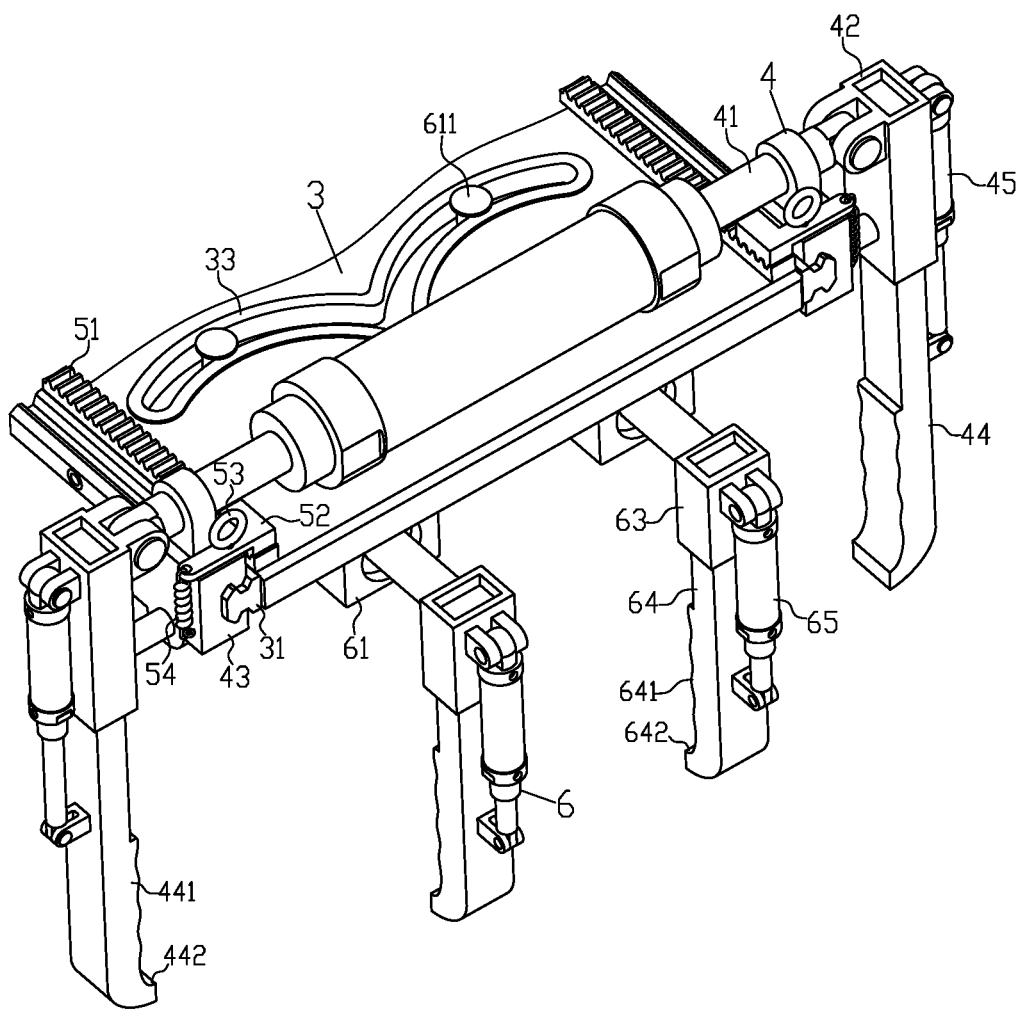
FIG. 4 illustrates a schematic view of a configuration relationship between a longitudinal clamping device and a transverse clamping device on a mounting seat at an outer side end of the present invention.
Figure 5:
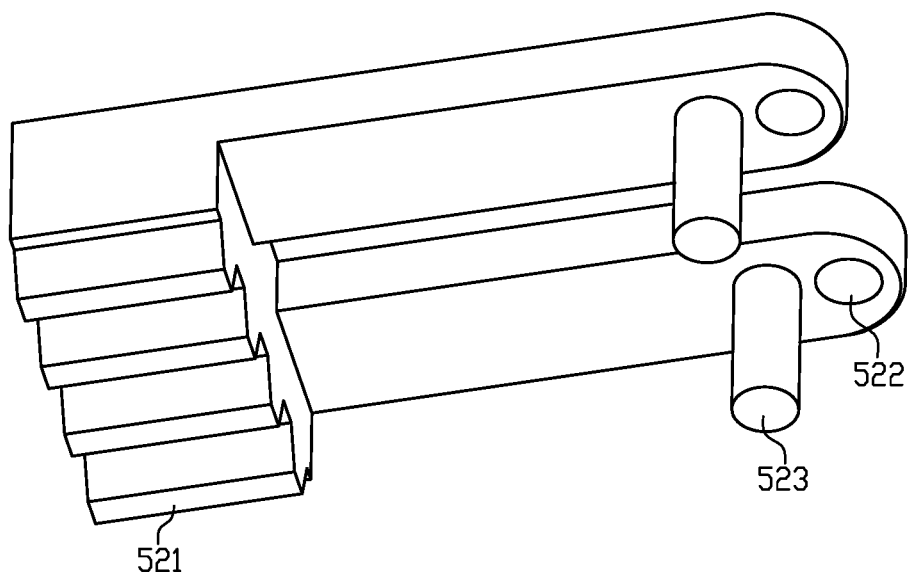
FIG. 5 illustrates a structural schematic view of an anti-slipping stop plate of the present invention.
Figure 6:
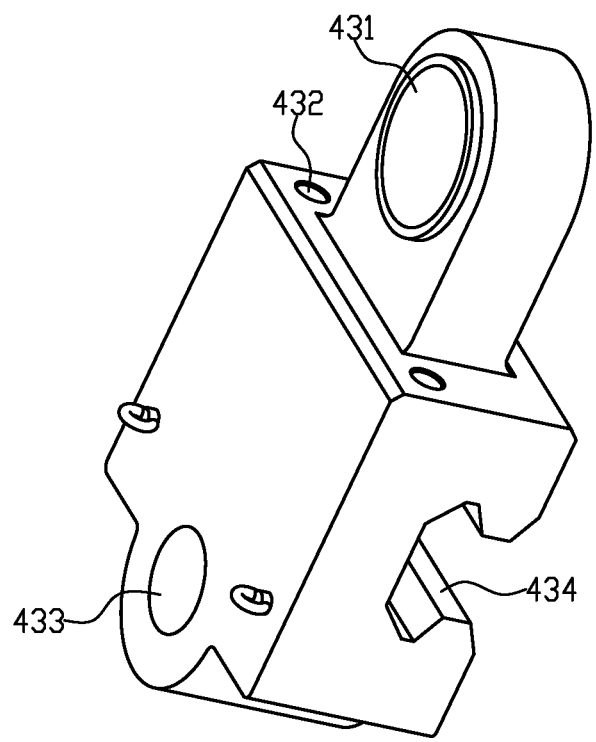
FIG. 6 illustrates a structural schematic view of a sliding block of the present invention.

As illustrated in FIG. 1, FIG. 2 and FIG. 4, each transverse clamping device 6 comprises a transverse clamping cylinder 61, a swinging angle adjuster 62, a transverse clamping sleeve 63, a transverse chuck 64 and a transverse chuck telescopic cylinder 65. Herein, the transverse clamping cylinder 61 is mounted below the mounting seat 3 and is used for providing power for the transverse movement of the transverse clamping sleeve 63 and the transverse chuck 64, a middle portion of the transverse clamping cylinder 61 is connected with the mounting seat 3 through a hinge, an inner side end of the transverse clamping cylinder 61 is connected with the swinging angle adjuster 62 through a hinge, a guide sliding pin 611 is further provided at a top of the inner side end of the transverse clamping cylinder 61, and the guide sliding pin 611 is disposed in the herringbone sliding groove 33 of the mounting seat 3 and is slidable along the herringbone sliding groove 33; and an outer side end of the transverse clamping cylinder 61 is fixedly connected with a top of the transverse clamping sleeve 63. The swinging angle adjuster 62 is fixedly mounted at a bottom of the mounting seat 3 and is connected with the mounting seat 3 through a hinge. The transverse chuck 64 is sleeve-mounted in the transverse clamping sleeve 63 and is used for transversely clamping castings or mold cores, and the transverse chuck 64 is upwards and downwards slidable along the transverse chuck sleeve 63 to adjust length of a clamped portion. An upper end of the transverse chuck telescopic cylinder 65 is connected with the transverse clamping sleeve 63 through a hinge, and a lower end of the transverse chuck telescopic cylinder 65 is connected with the transverse chuck 64 through a hinge and is used for providing power for extension and reaction movement of the transverse chuck 64; and the guide sliding pin 611 is connected with the transverse clamping cylinder 61 through a thread and a pin cap is provided at a top of the guide sliding pin 611.

As illustrated in FIG. 2, the swinging angle adjuster 62 comprises a swinging angle adjusting cylinder 621, a left connecting rod 622 and a right connecting rod 623, and is used for adjusting swinging angles of two transverse clamping devices 6. Herein, the swinging angle adjusting cylinder 621 is mounted at the bottom of the mounting seat 3 and is used for providing power for swinging of the transverse clamping devices 6, a middle portion of the swinging angle adjusting cylinder 621 is connected with the mounting seat 3 through a hinge, an outer side end of the swinging angle adjusting cylinder 621 is connected with the left connecting rod 622 and the right connecting rod 623 through coaxial hinges; the left connecting rod 622 is located on a left side of the swinging angle adjusting cylinder 621 and a left end of the left connecting rod 622 is connected with the transverse clamping cylinder 61 on a left side through a hinge; and a right end of the right connecting rod 623 is connected with the transverse clamping cylinder 61 on a right side through a hinge.

Embodiment 2

As illustrated in FIG. 1, FIG. 2 and FIG. 4, a first anti-slipping rubber layer 441 is provided at a lower end of the longitudinal chuck 44, and a first anti-falling hook 442 is further provided at the lowermost end of the longitudinal chuck 44 and is capable of preventing castings or mold cores from falling in the operation process; a second anti-slipping rubber layer 641 is provided at a lower end of the transverse chuck 64 and is used for increasing friction force between the transverse chuck 64 and the clamped castings or mold cores; and a second anti-falling hook 642 is further provided at the lowermost end of the transverse chuck 64 and can prevent castings or mold cores from falling in a clamping or handling process. Working surfaces of the first anti-slipping rubber layer 441 and the second anti-slipping rubber layer 641 are corrugated or intersected anti-slipping grooves are provided in the working surfaces. By adopting this design, castings or mold cores can be prevented from falling in the clamping or handling process or the operation process; and the longitudinal chuck 44 and the transverse chuck 64 can be prevented from being in rigid contact with the clamped castings or mold cores during working, clamped portions of castings or mold cores are prevented from being damaged in the clamping process, and friction force between the longitudinal chuck 44 and the transverse chuck 64 and the clamped castings or mold cores can be effectively increased. Other components and connection relationships are the same as that in embodiment 1.

Embodiment 3

As illustrated in FIG. 1, FIG. 2 and FIG. 4, the longitudinal clamping cylinder 41, the longitudinal chuck telescopic cylinder 45, the transverse clamping cylinder 61, the transverse chuck telescopic cylinder 65 and the swinging angle adjusting cylinder 621 are double-acting cylinders, double-acting hydraulic cylinders or linear actuators. An electromagnetic reversing valve and a safety valve are provided at the top of the mounting seat 3. By adopting this design, the clamping and loosening operations of the longitudinal chucks 44 in the front-rear direction and the elongation and shortening operations in the vertical direction can be facilitated, and the clamping and loosening operations of the transverse chucks 44 in the left-right direction and the elongation and shortening operations in the vertical direction are facilitated. Other components and connection relationships are the same as that in embodiment 1 or embodiment 2.

Embodiment 4

As illustrated in FIG. 1, FIG. 2 and FIG. 4, the number of the longitudinal clamping devices is 4-10, and each longitudinal clamping device 4 and the mounting seat 3 are independently connected and controlled through two transverse adjusting devices 5. By adopting this design, when the present invention grips castings or mold cores, two longitudinal chucks 44 of each longitudinal clamping device 4 can clamp according to the actual outlines and sizes of the clamped castings or mold cores, fitting-type effective gripping of specially-shaped castings or mold cores can be realized, each longitudinal clamping device 4 on the mounting seat 3 can realize clamping actions and load sharing, and the loading capacity of the present invention is improved. Other components and connection relationships are the same as that in embodiment 1, embodiment 2 or embodiment 3.

Embodiment 5

As illustrated in FIG. 2, cameras 7 are further provided at the bottom of the mounting seat 3 and the cameras 7 are connected with the mounting seat 3 through two-degree-of-freedom heads 8. This design is adopted for the purposes of acquiring images of the operation site through the cameras 7 before operation tasks are executed, performing effective recognition and judgment to the gripped castings or mold cores and surrounding environments and facilitating operation route planning and operation attitude optimization and adjustment performed by the casting robot for operation tasks. The use functions of the present invention are further expanded. Other components and connection relationships are the same as that in embodiment 1, embodiment 2, embodiment 3 or embodiment 4.

During use, firstly the longitudinal clamping devices 4 or transverse clamping devices 6 are selectively used according to casting operation tasks, and the transverse adjusting devices 5 are adjusted according to the shape of a gripped casting or mold core to keep reasonable spacing between the longitudinal clamping devices 4 on the mounting seat 3; and the hand ring 53 is manually lifted up to enable the anti-slipping stop plate 52 to be separated from the gear racks 51 and move leftwards and rightwards along the gear racks 51, so that the positions of the longitudinal clamping devices 4 on the mounting seat 3 can be adjusted. At the same time, swinging angles of the transverse clamping devices 6 at left and right ends of the mounting seat 3 are adjusted by driving the swinging angle adjusting cylinder 621 in the swinging angle adjuster 62. According to the height of the gripped casting or mold core, the longitudinal chuck telescopic cylinder 45 and the transverse chuck telescopic cylinder 65 are respectively driven, and positions of the longitudinal chuck 44 and transverse chuck 64 in the longitudinal clamping sleeve 42 and transverse clamping sleeve 63 are respectively adjusted. When the longitudinal clamping devices 4 only need to be used for longitudinally clamping the gripped casting or mold core, firstly output ends of the longitudinal clamping cylinders 41 are elongated, and front-rear spacing of the longitudinal chucks 44 is expanded; and then, the longitudinal clamping devices 4 are put on the gripped casting or mold core, and the output ends of the longitudinal clamping cylinders 41 are shortened to enable the longitudinal chucks 44 to clamp the casting or mold core, so that gripping and handling tasks can be executed. After the gripping and handling tasks are completed, the longitudinal clamping cylinders 41 are elongated, so that the longitudinal chucks 44 can be loosened. When the transverse clamping devices 6 need to be used, the loosening or clamping of the transverse chucks 64 can be realized by elongating or shortening the transverse clamping cylinders 61. When operation tasks are executed, the cameras 7 transmit acquired image information to the casting robot and a controller of the casting robot performs recognition, judgment and decision-making.

In the description of the present invention, it needs to be understood that orientation or position relationships indicated by terms such as "above", "below", "vertical", "top", "bottom", "inside", "outside", "from", "rear", "left" and "right" are orientation or position relationships based on the drawings, are just used for describing the present invention and simplifying the description instead of indicating or implying that the referred device or component must have a specific orientation and be constructed and operated according to the specific orientation, and thus shall not be understood as limitations to the present invention.

The basic principles, major features and advantages of the present invention are shown and described above. One skilled in the art shall understand that the present invention is not limited by the above-mentioned embodiments, what are described in the above-mentioned embodiments and description are just used for describing the principle of the present invention, the present invention may have various changes and improvements without departing from the spirit and scope of the present invention, and these changes and improvements shall be included in the scope requested to be protected by the present invention. The scope requested to be protected by the present invention is defined by the attached claims and equivalents thereof.

What is claimed is:

1. An omnidirectional multi-finger asynchronous gripper for a casting robot, comprising:
    a connecting seat, an arc-shaped support, a mounting seat, longitudinal clamping devices, transverse adjusting devices and transverse clamping devices;
    wherein connecting lugs are symmetrically provided at upper and lower ends of the connecting seat, connecting pins or pin holes are coaxially and symmetrically disposed on left and right sides of the connecting seat and a circular process hole is provided in a middle position of the connecting seat;
    an upper end of the arc-shaped support is fixedly connected with the connecting seat and a lower end of the arc-shaped support is fixedly connected with the mounting seat;
    guide rails are provided on front and rear sides of the mounting seat, a slotted process hole is provided between the two guide rails and herringbone sliding grooves are provided in left and right ends of the mounting seat;
    the longitudinal clamping devices are mounted on the mounting seat and are connected with the mounting seat through the transverse adjusting devices, and the transverse adjusting devices are mounted at two ends of the longitudinal clamping devices;
    the transverse clamping devices are symmetrically mounted at the left and right ends of the mounting seat;
    each longitudinal clamping device comprises a longitudinal clamping cylinder, a longitudinal clamping sleeve, a sliding block, a longitudinal chuck and a longitudinal chuck telescopic cylinder;
    two ends of the longitudinal clamping cylinder are mounted on the mounting seat through the transverse adjusting devices and are connected with a top of the longitudinal clamping sleeve through hinges;
    a mounting hole is provided in a top of the sliding block, a vertical guide hole is provided in an upper end of the sliding block, a longitudinal guide hole is provided in a lower end of the sliding block, a guide rail sliding groove is provided in an inner side of the sliding block, the sliding block is sleeve-mounted on a piston rod of the longitudinal clamping cylinder through the mounting hole, and the sliding block is sleeve-mounted on the guide rails of the mounting seat through the guide rail sliding groove and is connected with the mounting seat through the transverse adjusting devices;
    a section of the longitudinal clamping sleeve is homocentric-square-shaped, a longitudinal guide shaft is provided on an inner side of an upper end of the longitudinal clamping sleeve, and the longitudinal guide shaft is mounted in the longitudinal guide hole of the sliding block and is connected with the sliding block through a linear bearing or a sliding bearing;
    a section of a middle-upper portion of the longitudinal chuck is rectangular, the longitudinal chuck is sleeve-mounted in the longitudinal clamping sleeve, a first anti-slipping rubber layer is provided at a lower end of the longitudinal chuck and a first anti-falling hook is provided at the lowermost end of the longitudinal chuck;
    an upper end of the longitudinal chuck telescopic cylinder is connected with the longitudinal clamping sleeve through a first hinge and a lower end of the longitudinal chuck telescopic cylinder is connected with the longitudinal chuck through a second hinge;
    each transverse adjusting device comprises two gear racks, an anti-slipping stop plate, a hand ring and extension springs, the two gear racks are disposed in parallel at tops of front and rear ends of the mounting seat;
    stop teeth are provided below one end of the anti-slipping stop plate, a circular hook hole and a vertical guide pillar are provided at an other end of the anti-slipping stop plate, the vertical guide pillar is disposed in the vertical guide hole of the sliding block, the anti-slipping stop plate and the sliding block of the longitudinal clamping device are connected through two extension springs, and the anti-slipping stop plate is engaged with the two gear racks;

the hand ring is located on one side of the anti-slipping stop plate and is fixedly connected with the anti-slipping stop plate; and the two extension springs are symmetrically disposed on an outer side surface of the sliding block, upper ends of the extension springs are connected with the anti-slipping stop plate and lower ends of the extension springs are connected with the sliding block.

2. The omnidirectional multi-finger asynchronous gripper according to claim 1, wherein each transverse clamping device comprises a transverse clamping cylinder, a swinging angle adjuster, a transverse clamping sleeve, a transverse chuck and a transverse chuck telescopic cylinder, the transverse clamping cylinder is mounted below the mounting seat, a middle portion of the transverse clamping cylinder is connected with the mounting seat through a third hinge, an inner side end of the transverse clamping cylinder is connected with the swinging angle adjuster through a fourth hinge, a guide sliding pin is provided at a top of the inner side end of the transverse clamping cylinder, and the guide sliding pin is disposed in the herringbone sliding groove of the mounting seat and is slidable along the herringbone sliding groove; an outer side end of the transverse clamping cylinder is fixedly connected with a top of the transverse clamping sleeve; the swinging angle adjuster is fixedly mounted at a bottom of the mounting seat and is connected with the mounting seat through a fifth hinge; the transverse chuck is sleeve-mounted in the transverse clamping sleeve and is upwards and downwards slidable along the transverse chuck sleeve, a second anti-slipping rubber layer is provided at a lower end of the transverse chuck and a second anti-falling hook is provided at the lowermost end of the transverse chuck; an upper end of the transverse chuck telescopic cylinder is connected with the transverse clamping sleeve through a sixth hinge and a lower end of the transverse chuck telescopic cylinder is connected with the transverse chuck through a seventh hinge; and the guide sliding pin is connected with the transverse clamping cylinder through a thread and a pin cap is provided at a top of the guide sliding pin.

3. The omnidirectional multi-finger asynchronous gripper according to claim 2, wherein the swinging angle adjuster comprises a swinging angle adjusting cylinder, a left connecting rod and a right connecting rod, the swinging angle adjusting cylinder is mounted at the bottom of the mounting seat, a middle portion of the swinging angle adjusting cylinder is connected with the mounting seat through a eighth hinge, an outer side end of the swinging angle adjusting cylinder is connected with the left connecting rod and the right connecting rod through coaxial hinges; the left connecting rod is located on a left side of the swinging angle adjusting cylinder and a left end of the left connecting rod is connected with the transverse clamping cylinder on a left side through a ninth hinge; and a right end of the right connecting rod is connected with the transverse clamping cylinder on a right side through a tenth hinge.

4. The omnidirectional multi-finger asynchronous gripper according to claim 1, wherein an electromagnetic reversing valve and a safety valve are provided at the top of the mounting seat.

5. The omnidirectional multi-finger asynchronous gripper according to claim 1, wherein the longitudinal clamping cylinder, the longitudinal chuck telescopic cylinder, the transverse clamping cylinder, the transverse chuck telescopic cylinder and the swinging angle adjusting cylinder are double-acting cylinders, double-acting hydraulic cylinders or linear actuators.

6. The omnidirectional multi-finger asynchronous gripper according to claim 1, wherein the number of the longitudinal clamping devices is 4 or 5 or 6 or 7 or 8 or 9 or 10, and each longitudinal clamping device and the mounting seat are independently connected and controlled through two transverse adjusting devices.

7. The omnidirectional multi-finger asynchronous gripper according to claim 1, wherein working surfaces of the first anti-slipping rubber layer and a second anti-slipping rubber layer are corrugated or intersected anti-slipping grooves are provided in the working surfaces.

8. The omnidirectional multi-finger asynchronous gripper according to claim 1, wherein two cameras are provided at the bottom of the mounting seat and the two cameras are connected with the mounting seat through two-degree-of-freedom heads.

* * * * *